March 21, 1967  SHINICHIRO OGAWA ET AL  3,310,738
MEASURING SYSTEM HAVING PHOTOELECTRIC RESISTOR FUNCTIONING
AS BOTH A REBALANCE POTENTIOMETER AND CONVERTER
Filed Dec. 3, 1963

INVENTORS.
SHINICHIRO OGAWA
ICHIRO IDO
BY
Arthur H. Swanson
ATTORNEY.

United States Patent Office 3,310,738
Patented Mar. 21, 1967

3,310,738
MEASURING SYSTEM HAVING PHOTOELECTRIC RESISTOR FUNCTIONING AS BOTH A REBALANCE POTENTIOMETER AND CONVERTER
Shinichiro Ogawa, Chuo-ku, Tokyo, and Ichiro Ido, Yokohama, Japan, assignors to Honeywell Inc., a corporation of Delaware
Filed Dec. 3, 1963, Ser. No. 327,791
Claims priority, application Japan, Dec. 4, 1962, 37/53,601
3 Claims. (Cl. 324—99)

This invention relates to an automatically balancing instrument and more particularly to an instrument in which photoconductive material is used as a potentiometer in a potentiometer circuit and a light source in the potentiometer circuit is put on and off so that the potentiometer circuit acts as a converter in which a direct current is converted to an alternating current.

It is, therefore, an object of this invention to provide a potentiometer circuit in which a direct current is converted to an alternating current.

It is also an object of this invention to provide a balancing instrument in which a deviation between the voltage to be measured and the voltage of a potentiometer corresponding to the position of a light source is minimized by moving the light source.

It is another object of this invention to provide a balancing instrument in which the corrosion and wear experienced in the conventional type of automatically balancing instruments having a wound resistor potentiometer, and a converter having vibrating reeds, are eliminated.

Figure 1:
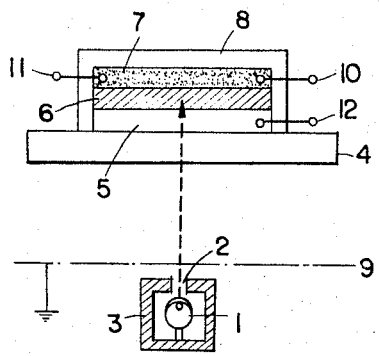
Figure 2:
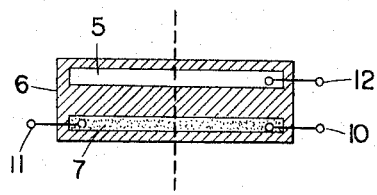
Figure 3:
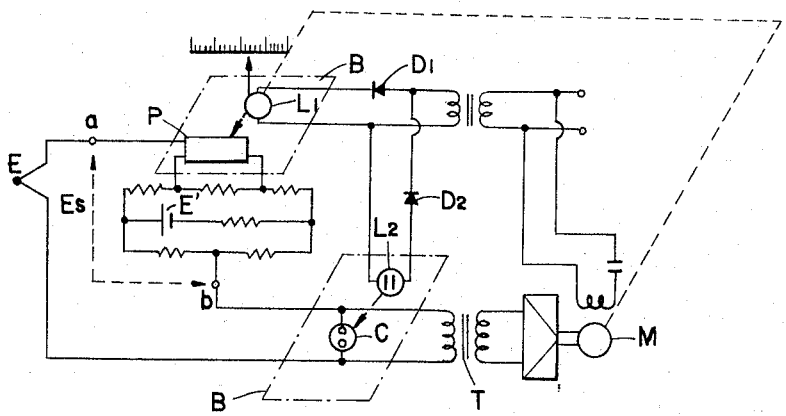

The object and advantage of this invention will become readily apparent from the following detailed description, in which:

FIG. 1 shows an embodiment of the potentiometer and the light source used in subject invention, FIG. 2 shows another embodiment of the potentiometer used in subject invention, and FIG. 3 is a connection diagram of subject invention.

In FIG. 1, light source 1 is provided in a case 3 and the light coming out of light source 1 passes through a slit 2 only. Electrically conductive material 5 is mounted on a base 4 which is made of transparent material such as glass, photoconductive material 6 is mounted on electrically conductive material 5 and a resistor 7 is mounted on photoconductive material 6. Each of electrically conductive material 5, photoconductive material 6 and resistor 7 is made of thin film and is gathered together to form a layer adhered closely. Protecting film 8 is made of paints such as resin and covers resistor 7 to prevent it from changing in quality due to the oxidation thereof. An electrostatic shield 9 is provided between case 3 and base 4 and is made of a fine metallic net which is grounded or a film of transparent electric conductive material which is made of a metal such as oxidized tin grounded so as to remove obstruction due to electrostatic induction coming from outside. All the elements 1 to 9 described above are prevented from receiving the influence of the outside light.

The operation of the apparatus shown in FIG. 1 is as follows: The light coming out of light source 1 is throttled by slit 2, passes through electrically conductive material 5 and is absorbed by photoconductive material 6. The resistance of the part of the photoconductive material absorbing the light is reduced rapidly and, therefore, resistor 7 conducts to material 5. The variation in resistor 7 is taken out at terminal 10 or 11 and terminal 12 as a variation in voltage so that there is produced a voltage or a resistance corresponding to the position illuminated by the light coming from light source 1 or corresponding to the degree of the operation of light source 1, which moves along base 4, is put on and off in synchronization with the frequency of an electrical source, and interlinks with the movement of the pointer of the instrument. A lens can take the place of slit 2 and minimize the illumination range of the light.

It is necessary to select wave lengths adapted to the light absorbing characteristics of the photoconductive material and if cadmium sulfide is used as the photoconductive material the wavelength of the light source may be 5000 to 6500 A. and if selenic cadmium is used the wavelength may be 7000 to 8000 A. The thickness of photoconductive material 6 is such that a photon can pass through the material or material 6 can access to resistor 7. It is desirable to select material which has small thermal electromotive force between electrical conductive material 5 and resistor 7.

In FIG. 2, electrical conductive material 5 and resistor 7 are put on photoconductive material 6 closely thereto and the illumination of light causes material 5 to conduct resistor 7. In FIG. 2, material 5 is not necessarily transparent.

In FIG. 3 is a circuit for an automatically balancing instrument in which D.C. deviation of potential is converted to A.C. In subject invention A.C. deviation signal is obtained by the operation of the potentiometer, said potentiometer including said photoconductive material incorporating a light source.

In FIG. 3, E is a thermocouple which detects the temperature to be measured, E' is a constant voltage source, and P is a potentiometer in which a photoconductive material is used. $L_1$ and $L_2$ are light sources, C is a photocell, $D_1$ and $D_2$ are diodes, T is an input transformer and M is a servo-motor which interlinks with the pointer of the instrument and the light source $L_1$.

The light source $L_1$ and potentiometer P are enclosed in a dark box B. When the light source $L_1$ is illuminating, the potentiometer P is operating to generate a voltage $E_s$ between terminals $a$ and $b$ which correspond to the position of the light source $L_1$. When the light source $L_1$ is not illuminating, the potentiometer P operates as a high resistance. The light sources $L_1$ and $L_2$ are put on and off by means of the diodes $D_1$ and $D_2$, respectively, in each different half cycle of the source voltage. The light source $L_2$ is also enclosed in the dark box B with the photocell C and when the light source $L_2$ is illuminating, the resistance of the photocell C decreases less than the input impedance of the primary winding of the transformer T. When the light source $L_2$ is not illuminating, the photocell represents a high resistance and the voltage difference between $E_s$ which appears between terminals $a$ and $b$ and E which is detected is applied to the primary winding of the transformer T without receiving any change. According to the sense of the deviation of voltage the phase of the input voltage of the transformer varies by 180° and the direction of rotation of the servomotor is determined by the synchronizing rectification so that the light source $L_1$ moves to a point corresponding to a voltage which is balanced with the detected voltage E.

As stated above, the alternating illumination of the light sources $L_1$ and $L_2$ causes the deviating signal to alternate.

While some preferred embodiments of the present invention are disclosed, it is recognized that the scope of the present invention is not limited thereto and it is therefore intended that the scope of the present invention be defined by the scope of the appended claims.

What is claimed is:
1. An automatically balancing instrument comprising a potentiometer including a conductive element, a resistive element, and a photoconductive element bridging said conductive and resistive elements,
light producing means to produce a movable beam of light falling on said photoconductive element, the position of said beam on said photoconductive element determining the adjusted value of said potentiometer, a direct current measuring circuit including said potentiometer and producing an error signal representing the difference between a value to be measured and said adjusted value of said potentiometer, means for interrupting said light beam at a predetermined frequency to cause said error signal to undulate at said frequency, alternating current servo means having input means and having a movable output member and operative to move said output member upon the application to said input means of a signal of said frequency, means connecting said measuring circuit to said input means for application thereto of said error signal, and means coupling said member to said light producing means to cause movement of said member to move said light beam on said photoconductive element to minimize said difference.

2. Apparatus as specified in claim 1,
including a photoconductive device connected across said input means of said servo means, and
including additional light producing means for illuminating said device to increase its conductivity whenever said beam is interrupted.

3. Apparatus as specified in claim 2,
wherein the first mentioned light producing means includes a first light source which is energized through a first diode from a source of alternating current of said frequency,
wherein said additional light producing means includes a second light source which is energized from said source through a second diode, and
wherein said diodes are poled to be alternately conductive.

References Cited by the Examiner
UNITED STATES PATENTS

| | | | |
|---|---|---|---|
| 1,514,123 | 11/1924 | Bacevicz | 250—211 |
| 2,668,264 | 2/1954 | Williams | 324—99 X |

OTHER REFERENCES

Electronics, vol. 34, No. 32, page 178, Aug. 11, 1961.

WALTER L. CARLSON, *Primary Examiner.*

J. J. MULROONEY, *Assistant Examiner.*